(12) United States Patent
Pengelly et al.

(10) Patent No.: US 10,646,388 B2
(45) Date of Patent: May 12, 2020

(54) SERVING APPARATUS

(71) Applicants: Lakshmy Pengelly, Llangennech (GB); Phillip Ashley Pengelly, Llangennech (GB)

(72) Inventors: Lakshmy Pengelly, Llangennech (GB); Phillip Ashley Pengelly, Llangennech (GB)

(*) Notice: Subject to any disclaimer, the term of this patent is extended or adjusted under 35 U.S.C. 154(b) by 0 days.

(21) Appl. No.: 16/112,085

(22) Filed: Aug. 24, 2018

(65) Prior Publication Data
US 2019/0175426 A1    Jun. 13, 2019

(30) Foreign Application Priority Data
Aug. 24, 2017  (GB) .................................. 1713615.1

(51) Int. Cl.
*A47B 39/00* (2006.01)
*A61G 5/10* (2006.01)
(Continued)

(52) U.S. Cl.
CPC ............ *A61G 5/1094* (2016.11); *A47B 3/063* (2017.08); *A47B 3/14* (2013.01); *A47B 83/02* (2013.01);
(Continued)

(58) Field of Classification Search
CPC .... A47B 5/00; A47B 5/04; A47B 5/06; A47B 3/063; A47B 3/00; A47B 2003/145;
(Continued)

(56) References Cited

U.S. PATENT DOCUMENTS

| | | | |
|---|---|---|---|
| 7,198,327 B2* | 4/2007 | Bergin ..................... | A47C 7/70 297/135 |
| 7,478,868 B2* | 1/2009 | Figueras Mitjans ..... | A47C 7/70 297/145 |

(Continued)

FOREIGN PATENT DOCUMENTS

| | | |
|---|---|---|
| CN | 202361014 U | 8/2012 |
| GB | 208625 | 12/1923 |
| KR | 20030080942 A | 10/2003 |
| NL | 1023669 C | 12/2004 |

OTHER PUBLICATIONS

Great Britain Search and Examination Report dated Feb. 21, 2018 for Great Britain Application No. 1713615.1, 6 pages.

*Primary Examiner* — Chi Q Nguyen
(74) *Attorney, Agent, or Firm* — McDonnell Boehnen Hulbert & Berghoff LLP

(57) ABSTRACT

A serving apparatus is provided to minimise risk of injurious events in a hospital or care setting. The serving apparatus comprises, a serving member having a serving platform; a rotation mechanism in rotatable communication with the serving member; a stand in communication with the rotation mechanism, the stand having a connecting portion; said connecting portion being arranged to reversibly couple the stand to an item of furniture; wherein the rotation mechanism is arranged to provide reciprocal rotation of the serving member between a stowed position and a serving position. The serving apparatus of the present invention aims to minimise the risk of falls or injurious spillages and may also maintain the healthy orthopaedic properties of furniture during mealtimes, without necessitating an awkward seating position wherein said orthopaedic properties become substantially defunct.

26 Claims, 8 Drawing Sheets

(51) Int. Cl.

| | | |
|---|---|---|
| *A47B 3/06* | (2006.01) | |
| *A47C 7/68* | (2006.01) | |
| *A47B 3/14* | (2006.01) | |
| *A47B 83/02* | (2006.01) | |
| *A47C 7/70* | (2006.01) | |
| *A47B 23/02* | (2006.01) | |
| *B60N 3/10* | (2006.01) | |
| *B60R 11/00* | (2006.01) | |
| *A47G 23/06* | (2006.01) | |

(52) U.S. Cl.
CPC ............... *A47C 7/68* (2013.01); *A47C 7/70* (2013.01); *A47B 23/02* (2013.01); *A47B 23/025* (2013.01); *A47B 2003/145* (2013.01); *A47B 2083/025* (2013.01); *A47B 2200/05* (2013.01); *A47B 2200/13* (2013.01); *A47G 2023/0691* (2013.01); *B60N 3/102* (2013.01); *B60R 2011/0082* (2013.01)

(58) Field of Classification Search
CPC ............ A47B 2200/05; A47B 2200/13; A47B 2083/025; A47C 7/70; B60N 3/102; B60R 2011/0082
USPC ............ 297/173, 162, 161, 145, 174 R, 135
See application file for complete search history.

(56) References Cited

U.S. PATENT DOCUMENTS

| | | | |
|---|---|---|---|
| 8,256,835 B2* | 9/2012 | Brink ................... | A47C 1/121 297/162 |
| 8,746,788 B2* | 6/2014 | Su ........................ | A47C 7/70 297/162 |
| 9,027,486 B1* | 5/2015 | Berkovitz ............. | B60N 3/002 108/40 |
| 10,349,749 B2* | 7/2019 | Su ........................ | A47C 7/70 |
| 10,383,434 B2* | 8/2019 | Enzinger ............... | A47B 5/04 |
| 2007/0132283 A1* | 6/2007 | Mitjans ................. | A47C 7/70 297/145 |
| 2008/0197678 A1* | 8/2008 | Olarte ................... | A47C 7/70 297/162 |
| 2009/0101047 A1 | 4/2009 | Mulaw et al. | |
| 2010/0090504 A1 | 4/2010 | Brink et al. | |
| 2010/0171350 A1* | 7/2010 | Large .................... | B60N 3/002 297/217.3 |
| 2011/0017103 A1 | 1/2011 | Lee | |
| 2011/0101740 A1* | 5/2011 | Koh ...................... | A47B 83/02 297/162 |
| 2014/0020605 A1 | 1/2014 | Barie | |
| 2014/0110977 A1* | 4/2014 | Madrigal .............. | A47C 7/70 297/173 |
| 2019/0090648 A1* | 3/2019 | Su ........................ | A47C 7/70 |

\* cited by examiner

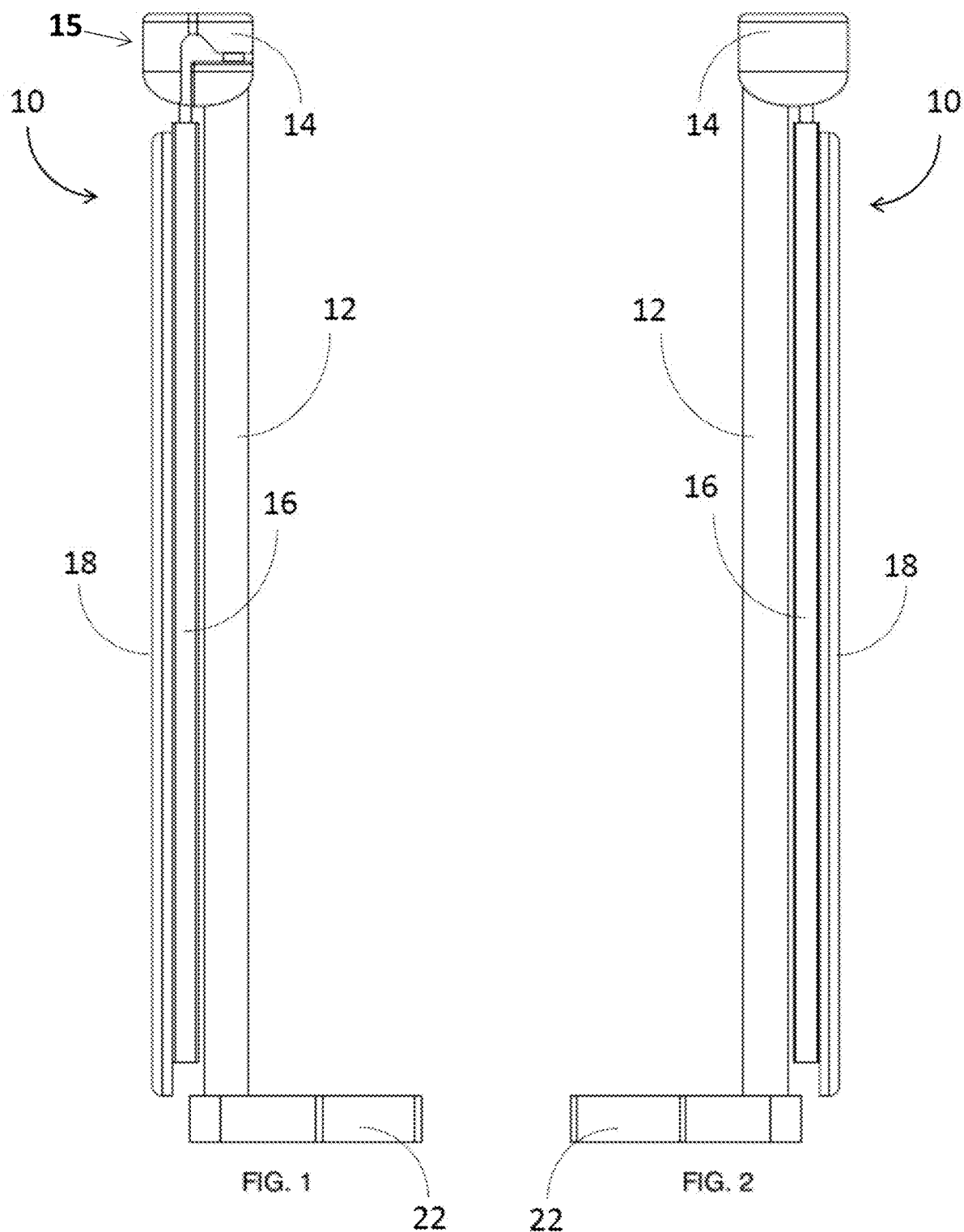

SERVING APPARATUS

CROSS-REFERENCE TO RELATED APPLICATIONS

This application claims the benefit of priority of United Kingdom Patent Application no. 1713615.1, filed Aug. 24, 2017, which is hereby incorporated herein by reference in its entirety.

FIELD OF THE INVENTION

The present invention relates to serving apparatuses, and in particular to serving apparatuses for providing a safe a secure eating platform for the weak and the frail, with the aim of reducing injury risk in the elderly.

BACKGROUND TO THE INVENTION

The proportion of the global population occupied by those over the age of 65 continues to increase, with many age-related disorders often requiring those suffering such conditions to seek assisted living, continuous care or to become hospitalised more frequently. Age-related frailty not only leads to an increase in fall risk, but also to a reduced rate of healing. As such, it is imperative to seek measures to reduce the risk of such injurious events in the ageing population.

Many such events occur while individuals are within an assisted living, care home or hospital setting, and can often be linked to the quality of furniture the individuals interact with on a daily basis.

We have identified that a common cause of falls in the elderly is the instability of furniture such as chairs and tables during, for example, mealtimes.

Current tables do not provide the necessary sturdiness or stability required to hold the weight of an individual who has become unbalanced during, for instance, standing from a seated position, or leaning forward in a seated position during mealtimes. In such cases, the fall risk is very high.

Tables and serving apparatuses according to current designs also often present a physical obstacle to frail individuals due to the overuse of floor space. Foldable tables can reduce the use of floor space when folded, but due to their folding mechanisms often collapse suddenly and abruptly under minimal pressure increasing risk of injury and falls. The foldable design, in such tables, is not optimised to suit the purpose of providing stability to an individual who has become unbalanced.

The positioning of currently available tables and serving apparatuses in their operative mode is also suboptimal and often necessitates that an individual deviate excessively from a comfortable posture or position, to one where said individual is likely to be in some discomfort or sustain an injury. In cases where furniture possesses beneficial orthopaedic properties, these properties are often nullified by such poor design of tables and serving apparatuses, since the individual must leave the optimum posture or position in order to operate or eat from said tables or serving apparatuses.

Currently available table and serving apparatus designs do not provide the combined properties of being stable and secure under multidirectional forces, while having minimal impact on floor space and being suitable for several types of furniture, and wherein risk of sudden collapse causing injury is mitigated.

It is therefore desirable to provide a serving apparatus solving the problems presented by current available tables and serving apparatuses, at least providing improved stability and reduced accident and fall risk in the elderly.

SUMMARY OF THE INVENTION

In accordance with a first aspect of the present invention there is provided a serving apparatus comprising, a serving member having a serving platform; a rotation mechanism in rotatable communication with the serving member; a stand in communication with the rotation mechanism, the stand having a connecting portion; said connecting portion being arranged to reversibly couple the stand to an item of furniture; wherein the rotation mechanism is arranged to provide reciprocal rotation of the serving member between a stowed position and a serving position.

The serving apparatus according to the first aspect of the present invention comprises a rigid stand member enabled to support the weight of a serving member and platform, wherein in preferable embodiments the serving platform takes the form of a table top. The serving platform and the serving member are rotatably coupled to the stand by means of a rotation mechanism, which enables the serving member and serving platform to rotate from a stowed position to a serving position. The stand is supported by its connection to an item of furniture by a connecting portion.

Preferably the connecting portion comprises an opening having at least one adjustable dimension; wherein said dimension is arranged to be adjusted to provide a secure coupling of the stand to the item of furniture.

In accordance with preferable embodiments, the connecting portion of the serving apparatus of the present invention is customisable to fit a number of different items of furniture of different dimensions. As such, the connecting portion arranged to couple the stand to an item of furniture preferably comprises an opening, said opening having an adjustable dimension for adjusting to fit different items of furniture. In accordance with most preferable embodiments, the coupling of the stand to an item of furniture by the connecting portion is secure and stable, suitable for withstanding forces in all directions without substantially altering the largely vertical orientation of the stand. In some embodiments, the opening may extend through the connecting portion forming an aperture. In alternate embodiments, the opening may be occluded by a surface. In embodiments wherein the opening is occluded by a surface, the additional surface area contact between the item of furniture and the connecting portion, provided by said occluding surface, preferably provides additional stability to the coupling between the connecting portion and the item of furniture. The connecting portion is preferably located on or about the stand. In additional embodiments, the serving apparatus may comprise a plurality of connecting portions, wherein a position of at least one of the connecting portions on the stand is preferably adjustable.

The connecting portion is preferably arranged to be coupled to a weight-bearing portion of the item of furniture. The weight-bearing portion is most preferably a limb member of said item of furniture, and even more preferable are embodiments wherein the item of furniture is a chair.

The most preferable embodiment of the present invention provides a serving apparatus having a stand arranged to be coupled to a chair leg, wherein the chair is preferably an arm chair, preferably situated in a care home or hospital environment. Stability is preferably afforded to the stand by being connected to a weight-bearing limb of the chair and thus the stand is preferably unlikely to move independently of said chair once coupled.

Preferably the serving platform comprises an indentation arranged to abut a lower surface of an object located substantially within said indentation. At least a portion of the serving platform preferably comprises a non-slip surface.

Most preferably an indentation comprises a cup holder or plate holder, which may be slightly depressed into the surface of the serving platform. In this way, the indentation preferably acts to inhibit excessive movement of objects placed upon the surface of the serving platform across a horizontal plane. Portions of the serving platform that preferably comprise a non-slip surface also provide a safety feature to inhibit excessive movement of objects on the surface across a horizontal plane. The indentations and/or the non-slip surface preferably provide additional safety features and are each complemented by the stability conferred to the serving platform by way of the secure coupling of the connecting portion to an item of furniture. These safety features preferably help to reduce the level of obstacle provided to a user of the present invention and preferably reduces risk of injurious events such as falls.

The serving member of the first aspect of the present invention, in the stowed position, preferably comprises a longitudinal axis that is substantially parallel to the longitudinal axis of the stand; and the serving member in the serving position preferably comprises a longitudinal axis that is substantially perpendicular to the longitudinal axis of the stand. The serving platform in the stowed position is preferably orientated in a substantially vertical plane; and the serving platform in the serving position is preferably orientated in a substantially horizontal plane.

In accordance with the preferable features of the present invention, the serving apparatus comprises a stowed position wherein the serving apparatus has minimal visual impact and uses up a minimal amount of space additional to the item of furniture coupled thereto. The movement to and from a stowed position to and from a serving position provides a safety feature of overcoming the limitations of fixed examples provided in the currently available technology, providing a removable obstacle to the movement of a user and preferably limiting the risk of injury. The serving platform, in the stowed position, is preferably orientated in a vertical plane such that the serving platform is preferably arranged substantially parallel to a surface of the item of furniture coupled to the stand. In this way, the serving platform preferably does not extend substantially away from the item of furniture and in such embodiments does not serve as an obstacle. In the serving position, the serving platform is preferably orientated in a horizontal plane and as such preferably provides a surface on which to rest objects such as food and drink.

The rotation of the serving member between a stowed position and a serving position preferably occurs through at least one intermediary position.

In most preferable embodiments, more than one period of rotation is provided between the stowed position and the serving position. Intermediary positions preferably provide for a more stable movement of the serving member between the stowed position and the serving position.

In accordance with most preferable embodiments, the rotation mechanism defines:
a first arc of reciprocal vertical rotation wherein the serving member is arranged to reciprocally rotate between the stowed position and a first intermediary position;
wherein in the first intermediary position, the longitudinal axis of the serving member is substantially perpendicular to the longitudinal axis of the stand and the serving platform remains orientated in a substantially vertical plane;
a second arc of reciprocal rotation wherein the serving member is arranged to reciprocally rotate between the first intermediary position and a second intermediary position, wherein in the second intermediary position the longitudinal axis of the serving member remains substantially aligned with the longitudinal axis of the serving member in the first intermediary position, and the serving platform is arranged in a substantially horizontal plane; and
a third arc of reciprocal horizontal rotation wherein the serving platform is arranged to reciprocally rotate between the second intermediary position and the serving position; wherein during said rotation, the serving platform remains in a substantially horizontal plane.

As such, in the most preferable embodiments, the rotation mechanism provides for three periods of rotation of the serving member and or the serving platform, wherein preferably the serving member and platform are rotated in a vertical plane while substantially maintaining their plane of orientation. The serving member and/or the serving platform are then preferably rotated such that their plane of orientation changes from vertical to horizontal. While in said horizontal plane, the serving member and serving platform are then preferably rotated across the horizontal plane into proximity with a user.

The rotation mechanism preferably comprises a retardation mechanism (15 in FIG. 1) arranged to retard at least one period of rotation of the serving member. In some embodiments, the rotation mechanism comprises a low-friction portion.

Different safety features are preferably conferred by either a retardation mechanism or a low friction portion, and serving apparatuses according to preferable embodiments may comprise none, one or both of these features. The retardation mechanism preferably provides for a slower rotation of the serving member with respect to the stand, and as such the serving member may not rotate as quickly and is therefore less likely to move quickly or collapse immediately under force, allowing a brief period of support to be provided to a user using the serving member or the serving platform as a stabiliser. This can be particularly useful for the frail. In a converse situation, in order to aid movement of the serving member in specific arcs of rotation, preferably provided enhanced longevity for the serving apparatus of the present invention, the rotation mechanism may preferably provide a low-friction portion.

The position of the rotation mechanism is preferably adjustable with respect to the stand.

In some embodiments, the position of the rotation mechanism may not be at a terminal end of the stand, but may comprise and adjustable locus. In embodiments wherein the position of the rotation mechanism is adjustable with respect to the stand, this adjustment may be by a secure movement mechanism that does not compromise the stability of the serving platform when in the serving position owing to the secure coupling of the stand to the item of furniture by the connecting portion. Preferably the adjustment of the position of the rotation mechanism with respect to the stand confers maximum adjustability of the serving apparatus of the present invention to suit diverse types and sizes of items of furniture.

The serving platform is preferably coupled to the serving member. In some such embodiments, the serving apparatus is reversibly coupled to the serving member. In some embodiments the serving platform is arranged to move with respect to the serving member.

In some embodiments of the first aspect of the present invention the serving platform may be separate from the serving member and may be coupled to and enabled to move independently of the serving member. In accordance with some embodiments, the movability of the serving platform with respect to the serving member may enhance the suitability of the serving apparatus of the present invention for particular applications, and may provide a more favourable stowed position and/or serving position for such applications.

The serving platform comprises a concave edge; wherein the concave edge is arranged to maximise proximity of the serving platform to a user.

Maximum safety is achieved when the serving platform reaches maximum proximity to a user in order to avoid spillages which can cause injury. Maximum proximity is preferably provided by a serving platform having a concave edge, and as such more of a snug fit can be achieved around a user. In most preferable embodiments, the serving platform comprises a substantially oval shape, with the longitudinal edge of the semi-oval most proximate the user being concave, conferring a substantially kidney- or bean-shape.

The serving apparatus is preferably modular, comprising reversible coupling between at least one selected from the range: serving member, serving platform, rotation mechanism, stand, connecting portion.

As such assembly and/or disassembly and/or storage of the serving apparatus of the present invention from its component parts is preferably enabled, providing for replacement of parts more susceptible to wear such as the serving platform, the serving member and the rotation mechanism. In such a way, the serving apparatus of the present invention is also customisable to replacement items of furniture which may require, for example, a stand, serving member and/or serving platform of alternate dimensions. Such a replacement may be necessary if the item of furniture succumbs to wear and tear before the serving apparatus, and as such a replacement is sought. Embodiments will be conceivable wherein any and all of the component parts of the serving apparatus of the present invention may be modular and of adjustable dimensions to aid suitability for a diverse array of applications.

In some embodiments of the first aspect of the present invention, the rotation mechanism comprises a motor, the motor being arranged to provide motorised rotation of the serving member. Preferably operation of the motor is controlled by a user using a control panel.

In some embodiments, a dimension of the stand is adjustable. Preferably said dimension is the length of the stand.

In accordance with a second aspect of the present invention there is provided a chair comprising a serving apparatus as claimed in any one of the preceding claims. Most preferably the serving apparatus is affixed to a leg of the chair.

The chair in accordance with the second aspect of the present invention is most preferably and arm chair having enhanced orthopaedic features to be most suitable within a care home or hospital setting. The serving apparatus of the present invention preferably provides the chair with an additional feature of a stable and secure serving platform which can limit the risk of injurious events such as falls and spillages.

BRIEF DESCRIPTION OF THE DRAWINGS

Specific embodiments will now be described by way of example only, and with reference to the accompanying drawings, in which:

FIG. 1 provides a profile view of a serving apparatus according to the first aspect of the present invention in the stowed position;

FIG. 2 provides an additional profile view of a serving apparatus according to FIG. 1;

DETAILED DESCRIPTION

Figure 3:
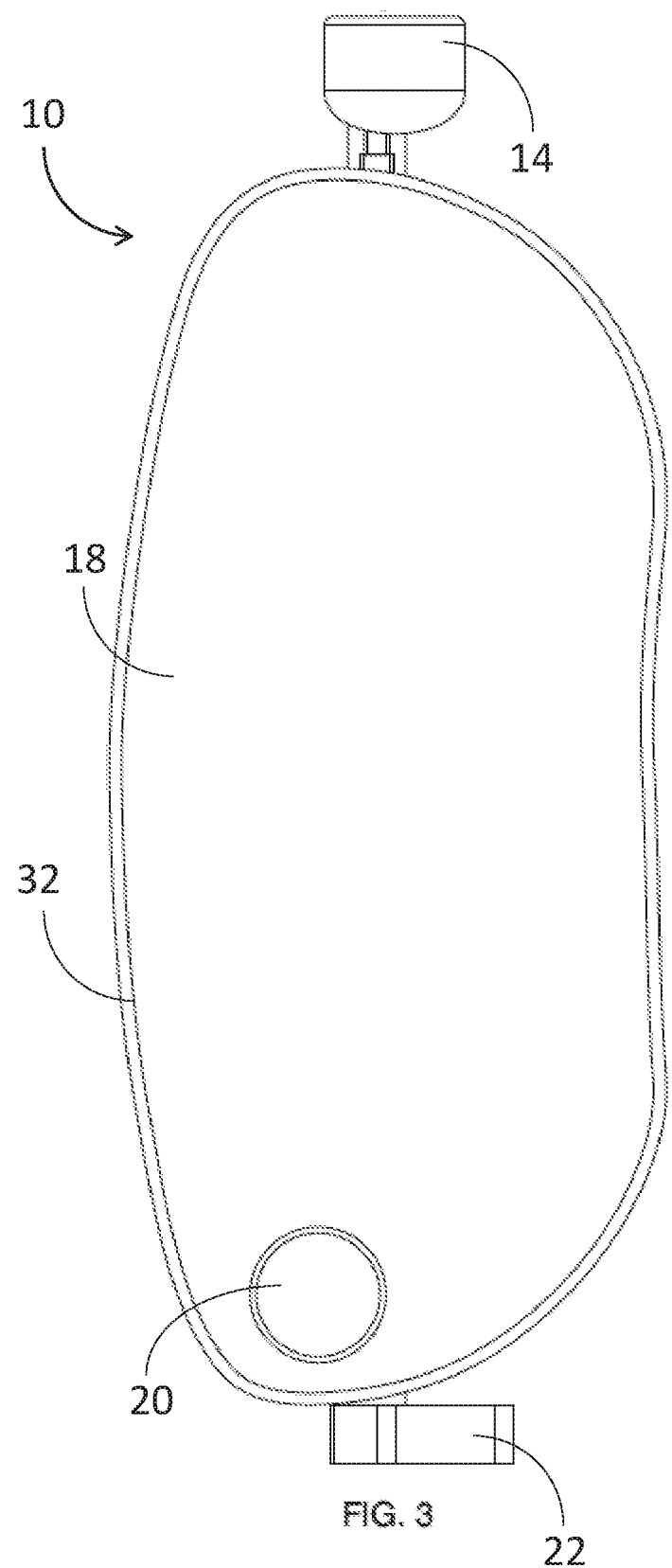
FIG. 3 provides an additional profile view of a serving apparatus according to FIG. 1 providing a view of a serving platform.
Figure 4:
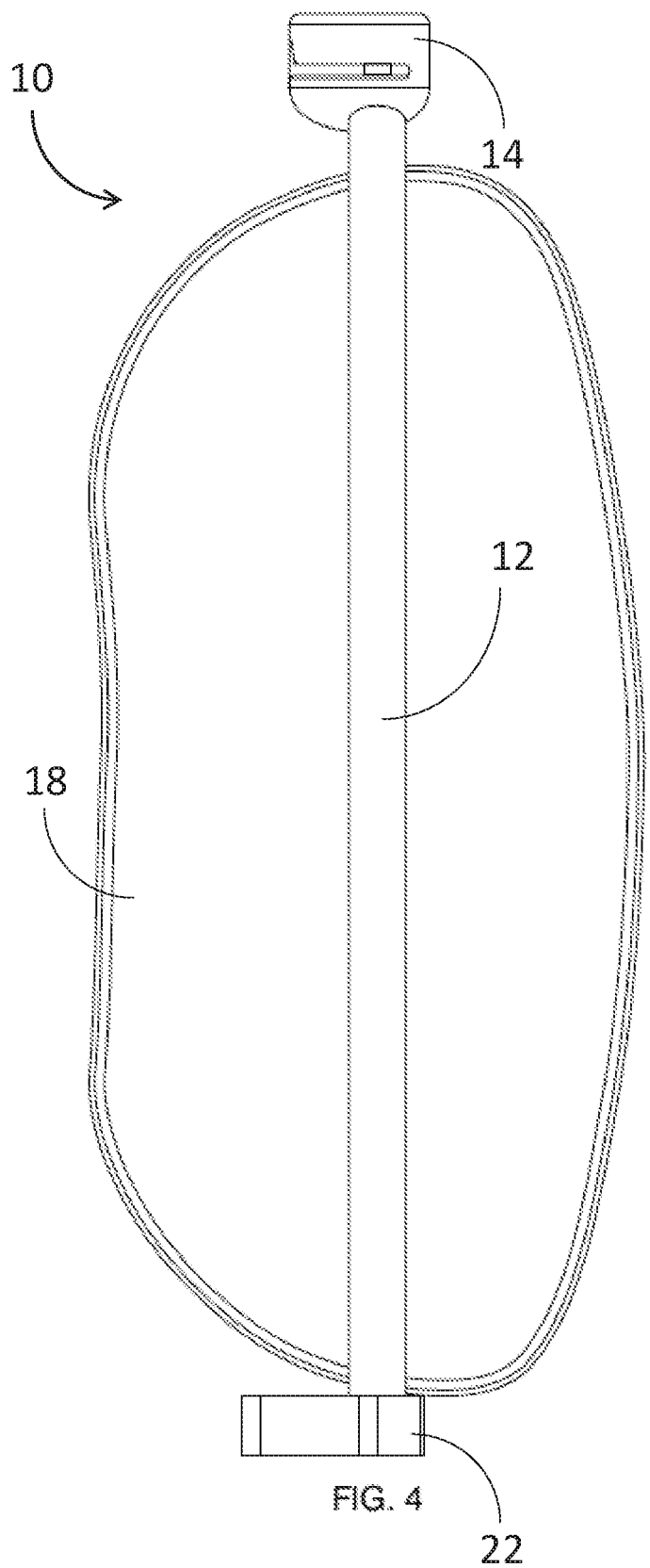
FIG. 4 provides an additional profile view of a serving apparatus according to FIG. 1 providing a rear view of the serving platform of FIG. 3.
Figure 5:
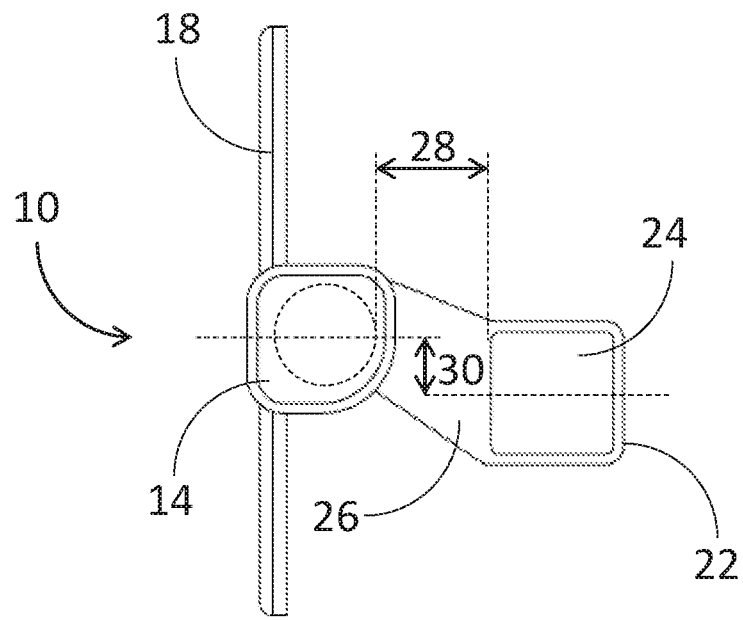
FIG. 5 provides a plan view of the serving apparatus of FIG. 1 to FIG. 4.
Figure 6:
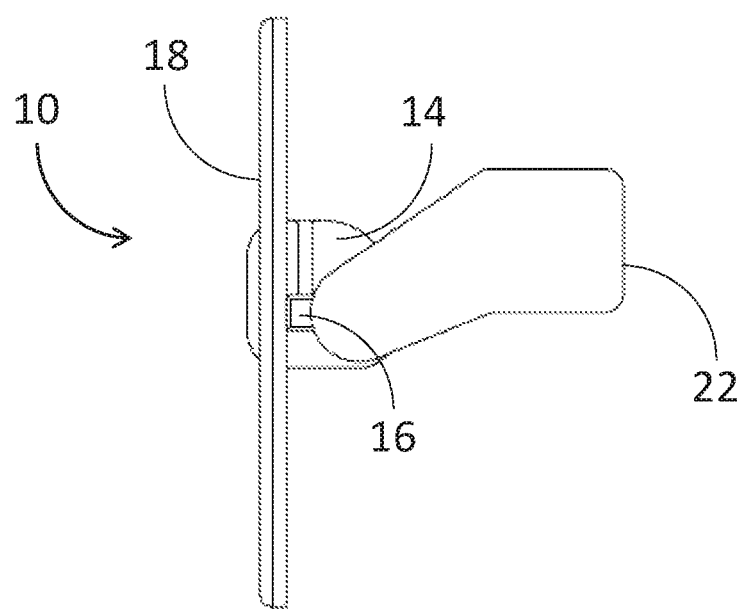
FIG. 6 provides a bottom view of the serving apparatus of FIG. 1 to FIG. 4.

Referring first to FIG. 1 to FIG. 6, there is shown an embodiment of a serving apparatus 10 according to the first aspect of the present invention. The serving apparatus 10 of the embodiment shown comprises a metal stand 12 being oriented such that the longitudinal axis of the stand 12 is substantially vertical. The stand 12 comprises a first terminal end at an uppermost end of the stand 12 and second terminal end located at a lowermost end of the stand and diametrically opposed to the first terminal end. Affixed to the first terminal end is a rotation mechanism 14, having a body forming a substantially cuboidal structure and a channel, the channel extending across two vertically aligned faces of the body and one horizontally aligned face of the body of the rotation mechanism. The channel defines three axes of rotation for an elongate metal serving member 16 coupled thereto. The serving member 16 is arranged in a stowed position and as such depends vertically from a portion of the channel extending along a substantially horizontally aligned surface of the rotation mechanism 14, the serving member 16, in said stowed position, having a longitudinal axis that is substantially parallel to the longitudinal axis of the stand 12. The channel of the rotation mechanism 14 comprises a retardation mechanism (not shown), wherein rotation of the serving member 16 is retarded along one axis of rotation.

A planar serving platform 18 is coupled to the serving member 16, the serving platform 18 being comprised substantially of polymeric material having a smooth finish, and forming a substantially kidney-shaped planar surface, wherein the longest axis of the kidney is oriented substantially parallel to the longitudinal axis of the serving member 16. A lip 32 is positioned around the circumference of the surface of the serving platform 18. One surface of the serving platform 18 comprises, at an end of the serving platform 18 distal to the rotation mechanism 14, a circular indentation 20 forming a cup holder.

At the second terminal end of the stand 12 is a connecting portion 22 coupled thereto, the connecting portion 22 having an opening 24 of substantially rectangular shape having a width and a length. The connecting portion 22 further comprising a spacing portion 26 providing a fixed length 28 and a fixed offset distance 30, wherein the length 28 defines the distance between the stand 12 and the opening 24, and the offset distance 30 defines the distance between the centre line of the stand 12 and the centre line of the opening 24.

Figure 7:
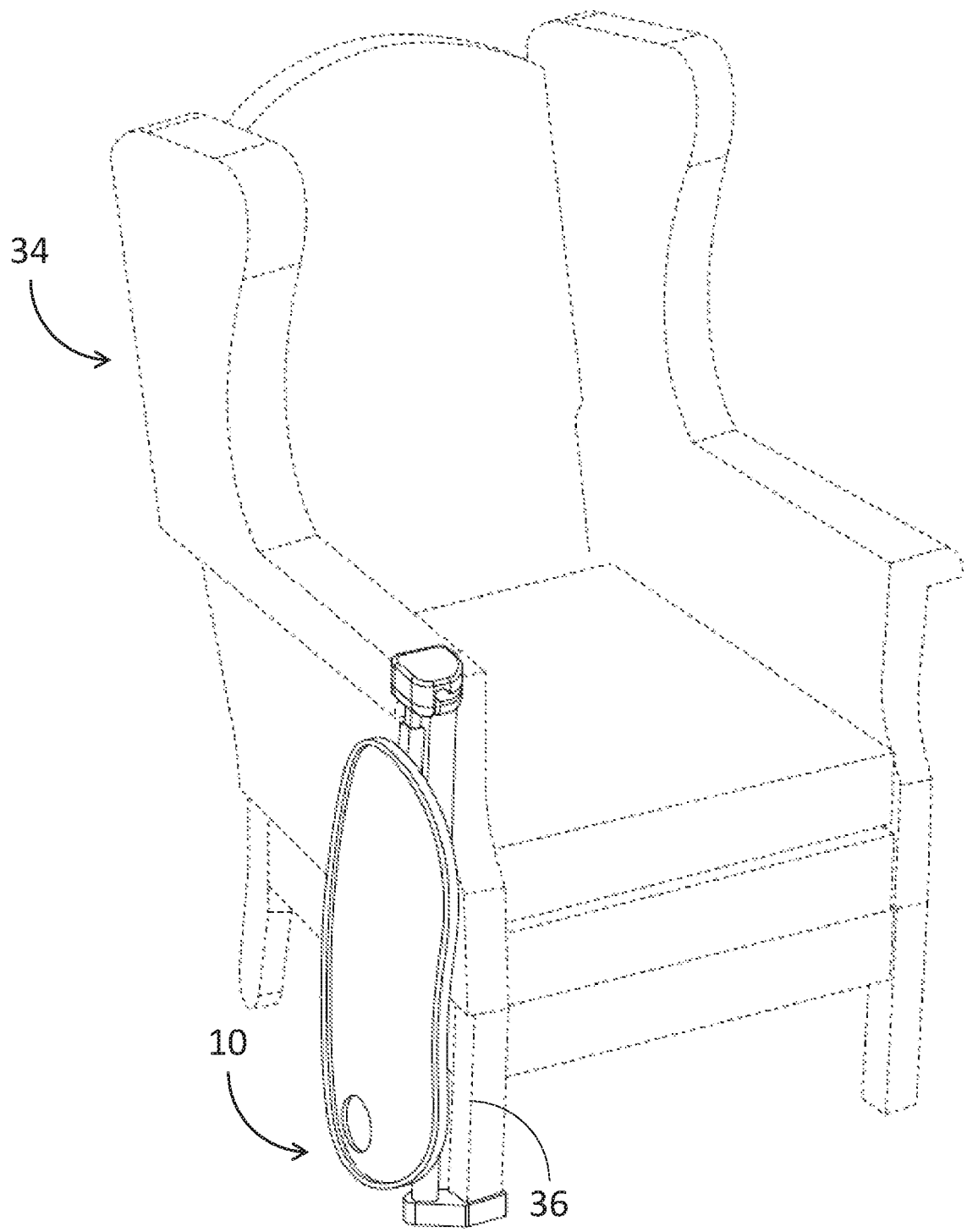
FIG. 7 provides a perspective view of serving apparatus according to the first aspect of the present invention in a stowed position, and coupled to a chair according to the second aspect of the present invention.
Figure 8:
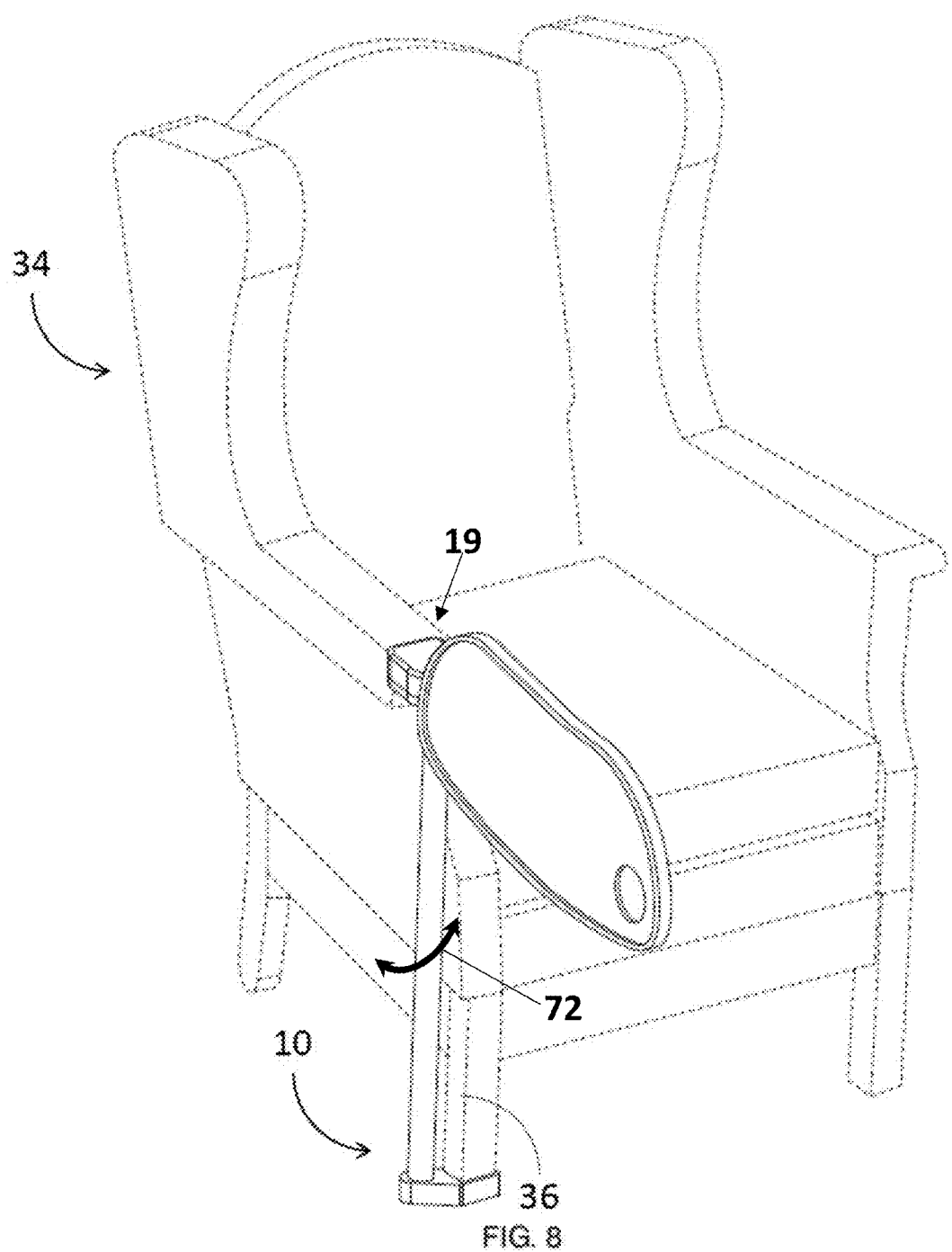
FIG. 8 provides a perspective view of serving apparatus and chair according to FIG. 7, the serving apparatus in an intermediary position.
Figure 9:
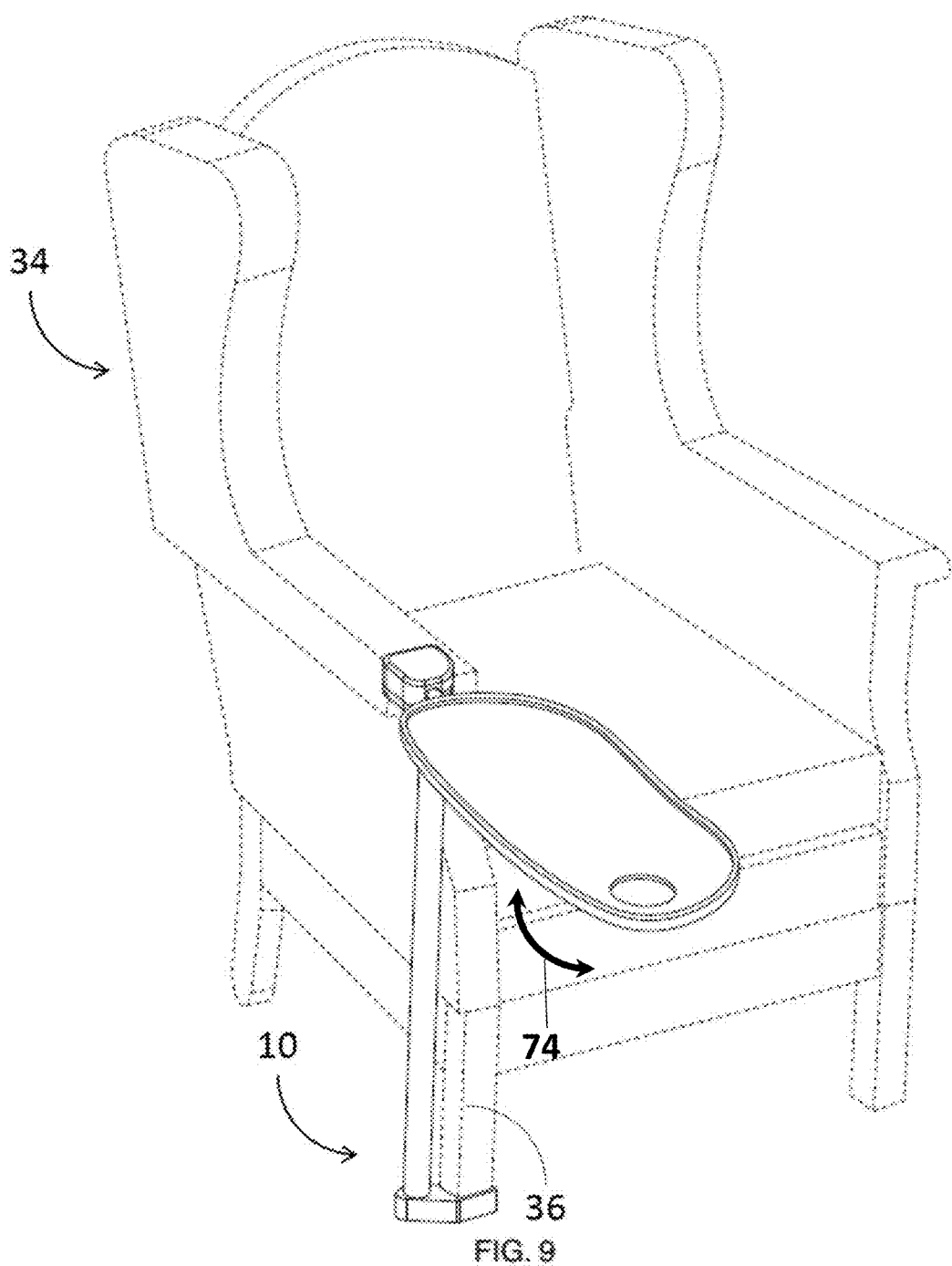
FIG. 9 provides a perspective view of serving apparatus and chair according to FIG. 8, the serving apparatus in an additional intermediary position.
Figure 10:
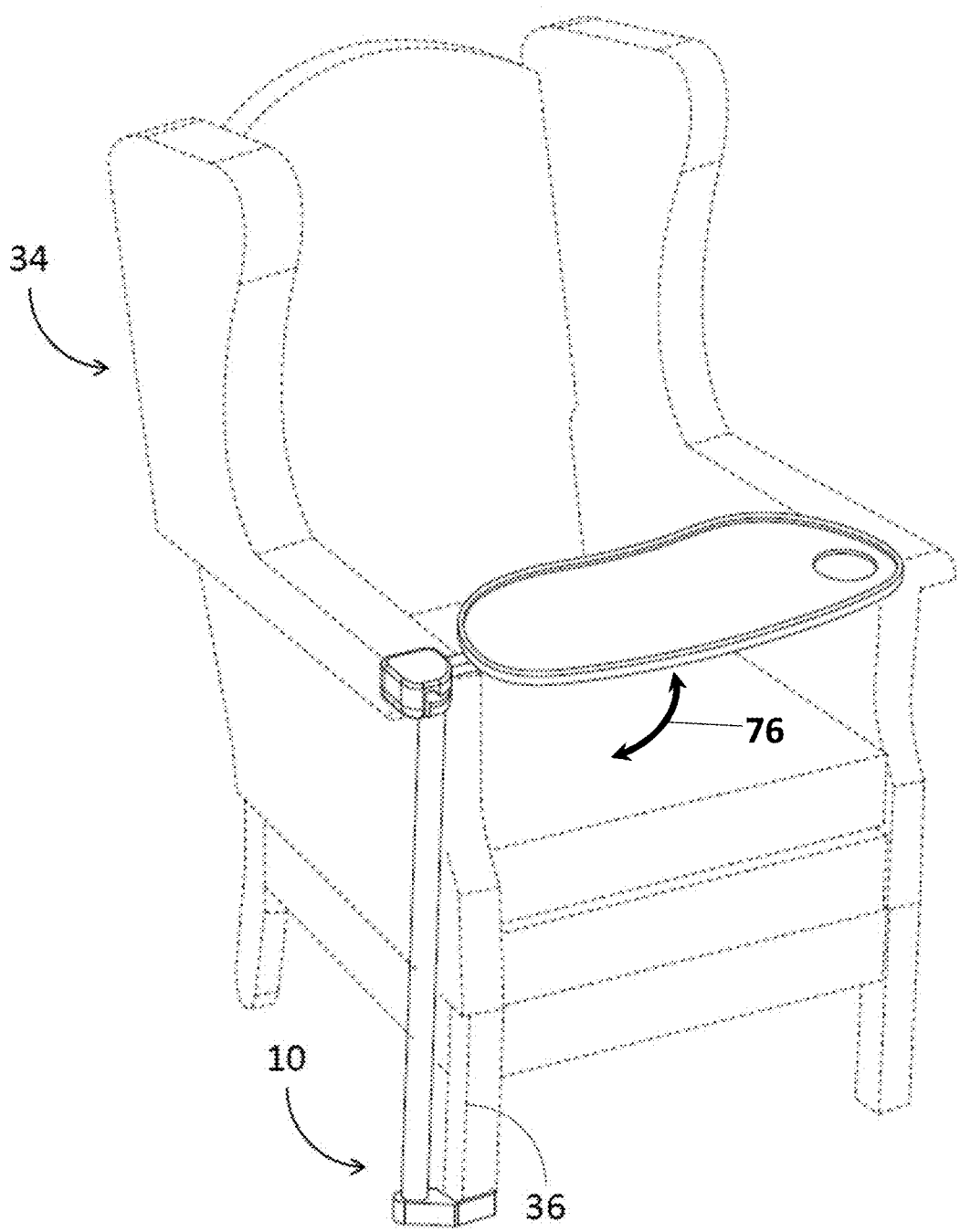
FIG. 10 provides a perspective view of serving apparatus and chair according to FIG. 8, the serving apparatus in a serving position.

In use, the width and the length of the opening 24 are adjustable using an adjustment tool (not shown). The opening 24 of the embodiment shown in FIG. 1 to FIG. 6 houses a portion of a chair leg 36 as is shown in FIG. 7. The width and length of the opening 24 can be adjusted to form a close fit to said chair leg 36. In such a way, the connecting portion 22 is coupled to said chair leg 36, which bears the weight of a chair 32 and an occupant of said chair (not shown), thereby providing stability to the coupling of the connecting portion 22 to said chair leg 36 and limits movement of the connecting portion 22. The stand 12 is arranged to extend from the connecting portion 22, which is stably coupled to said chair leg 36, and the stand 12 is thereby arranged to inherit stability from said coupling between the connecting portion 22 and the chair leg 36, and as such movement of the stand 12 is also limited. At an end of the stand 12 distal to the connecting portion 22, and diametrically opposed the connecting portion 22, is the rotation mechanism 14 which further inherits stability and limited movement from the stand 12 and the connecting portion 22. The serving member 16, coupled at one end to the rotation mechanism 14, is arranged to reciprocally rotate about three axes of rotation defined by the rotation mechanism 14, in order to move from a stowed position as is represented in FIG. 1 to FIG. 7, to a serving position represented in FIG. 10, passing (via first arc of reciprocal rotation 72) through a first intermediary position represented in FIG. 8, and (via second arc of reciprocal rotation 74) a second intermediary position represented in FIG. 9. The serving platform 18 rotates (via third arc of reciprocal rotation 76) along with the serving member 16, to which it is coupled, and as such, while in the serving position (FIG. 10), the serving platform 18 provides a suitable surface on which to rest objects. The lip 32 acts to limit movement of objects off the serving platform 18 and also to contain spillages while the serving platform 18 remains in the serving position. The indentation 20, which acts as a cup holder, provides facility for cups to remain stable while place on the surface of the serving platform 18, while the serving platform remains in the serving position. FIG. 8 also shows the position of an optional motor via reference numeral 19.

The first axis of rotation is substantially vertical, during movement along which, between the stowed position (FIG. 1 to FIG. 7) and the first intermediary position (FIG. 8), the planar serving platform 18 is arranged in a substantially vertical plane. The second axis of rotation is substantially vertical, and is in a plane substantially perpendicular to said first axis of rotation, during movement along which, between the first intermediary position (FIG. 8) and the second intermediary position (FIG. 9), the orientation of the planar serving platform 18 is changed from being in a substantially vertical plane to being in a substantially horizontal plane. The third axis of rotation is substantially horizontal, during movement along which, between the second intermediary position (FIG. 9) and the serving position (FIG. 10), the planar serving platform 18 remains oriented in a substantially horizontal plane.

The spacing portion 26 of the connecting portion 22 provides a distance between the opening 24 and the stand 12, thereby providing a suitable distance between the chair 34 and the stand 12. This distance provides for safe and effective rotation of the serving member 16 and the serving platform 18 between the stowed position and the serving position. The offset distance 30 provides for a suitable positioning of the stand 12 with respect to a front edge of the chair 34 such that rotation between a suitable stowed position and a suitable serving position can be achieved.

A suitable stowed position is characterised as providing minimal visual impact and minimal use of space, but while allowing the serving apparatus 10 to still act as a support mechanism, able to withstand forces which may be uni- or multi-directional and may result from a chair occupant losing balance. A suitable serving position is characterised as having the serving member 16 and the serving platform 18 in close proximity with a chair occupant (not shown) such that any orthopaedic properties of said chair are maintained and risk of injurious events such as falls, spillages or other meal-time associated injury is minimised during use of the serving member 16 and serving platform 18.

A perspective view of a chair 34 according to the second aspect of the present invention is shown in FIG. 7 to FIG. 10, said chair 34 comprising a serving apparatus 10 according to the first aspect of the present invention.

In the embodiment shown, the chair 34 is an armchair. Embodiments will be conceivable wherein the chair is one of entirely different overall look, design or shaping.

It will be appreciated that the above described embodiments are given by way of example only and that various modifications may be made to the described embodiments without departing from the scope of the invention as defined in the appended claims. The structure and orientation of the stand may be of an alternative design and shaping, and various modifications may be made to the stand, rotation mechanism, connecting portion, serving member and serving platform whilst remaining within the scope of the present disclosure.

The rotation mechanism 14 of the embodiment shown comprises a retardation mechanism 15. In the embodiment shown, the retardation mechanism is provided due to the snug fit of the serving member within the channel, such that friction during rotation causes a retardation effect upon rotation along the first axis of rotation between the stowed position and the first intermediary position. As such, improved safety is provided in that the probability that rotation of the serving member 16 and serving platform 18 will cause injury is minimised. Embodiments will be conceivable wherein the rotation of the serving member is aided by a motor.

Embodiments will be conceivable wherein a retardation mechanism can optionally also be used to retard other axes of rotation. An alternate retardation mechanism may comprise a damper, such as a hydraulic ram, piston and cylinder mechanism, to retard movement of a portion of the serving apparatus of the first aspect of the present invention.

In the embodiment shown, the surface of the serving platform 18 comprises a polymeric material such as, for example, plastic, having properties including that it is easy to clean. Embodiments will be conceivable wherein the surface of the serving platform 18 comprises a metal, a wood, a rubber, a composite material or other material having properties optimal for cleaning and for safety. In the embodiments shown, the surface of the serving platform 18 comprises a smooth finish, but embodiments will be conceivable wherein the surface comprises a textured finish to provide an anti-slip surface or a stimulatory surface. Embodiments will be conceivable wherein the serving member 16 and/or serving platform 18 comprise a handle to aid in the rotation of the serving member 16 or serving platform 18. In the embodiment shown, the stand is a rigid material, such as for example metal, having structural properties providing maximum stability during operation of the serving apparatus. Embodiments will be conceivable wherein the stand comprises other materials such as for example wood or polymeric material, which may confer more favourable stability to the serving apparatus during operation.

In the embodiment shown, said length 28 and said offset distance 30 are fixed. Embodiments will be conceivable, however wherein said length 28 and said offset distance 30 will be variable and adjustable to suit different applications. In the embodiment shown, the opening 24 has a substantially rectangular cross section. Embodiments will be conceivable wherein the opening 24 has a cross-section having a different shape, such as, for example, circular or triangular. Embodiments will be conceivable wherein the shape of the opening 24 will be adjustable. In the embodiment shown, the connecting portion 22 is fixed to the stand 12. Embodiments will be conceivable wherein the connecting portion 22 is removable and interchangeable with a connecting portion having different shape and/or dimensions and/or a connecting portion that defines a different length and/or offset distance. In embodiments wherein the connecting portion 22 is removable and/or interchangeable, the coupling of the connecting portion to the stand is such that stability of the serving apparatus 10 is not compromised. Further embodiments will be conceivable wherein the apparatus comprises a plurality of connecting portions, wherein the position of at least one of the plurality of connecting portions may be adjustable. In such embodiments, coupling of the stand to an item of furniture using additional connecting portions may provide added stability to the serving apparatus.

The described embodiments have been discussed wherein the item of furniture is a chair 34. Embodiments of the first aspect of the present invention will be conceivable wherein the item of furniture is a chair of different overall style, design or shaping, and further embodiments will be conceivable wherein the item of furniture is not a chair, such as a bed, or a bedside or chair side cabinet. The item of furniture may have, or be in close proximity to another item of furniture, having a seating function.

The invention claimed is:

1. A serving apparatus comprising,
  a serving member and a serving platform coupled to the serving member;
  a rotation mechanism in rotatable communication with the serving member;
  a vertically-extending stand in communication with the rotation mechanism disposed proximal an upper end thereof, the vertically-extending stand having a connecting portion distal the upper end thereof;
  said connecting portion being arranged to reversibly couple the stand to an outer surface of an item of furniture;
  wherein the rotation mechanism is arranged to provide reciprocal rotation of the serving member between a stowed position and a serving position, wherein when in the serving position the serving platform is disposed to provide an upper surface configured to provide a surface on which a user disposed on the item of furniture can be served a meal,
  the serving apparatus not being coupled to the item of furniture.

2. A serving apparatus as claimed in claim 1, wherein the connecting portion comprises an opening having at least one adjustable dimension; wherein said dimension is arranged to be adjusted to provide a secure coupling of the stand to an outer surface of said item of furniture.

3. A serving apparatus as claimed in claim 1, wherein the connecting portion is arranged to be coupled to a weight-bearing portion of the item of furniture.

4. A serving apparatus as claimed in claim 3, wherein the weight-bearing portion is a limb member of said item of furniture.

5. A serving apparatus as claimed in claim 3, wherein said item of furniture is a chair.

6. A serving apparatus as claimed in claim 1, wherein the serving platform comprises an indentation arranged to abut a lower surface of an object located substantially within said indentation.

7. A serving apparatus as claimed in claim 1, wherein at least a portion of the serving platform comprises a non-slip surface.

8. A serving apparatus as claimed in claim 1, the serving member in the stowed position comprising a longitudinal axis that is substantially parallel to the longitudinal axis of the stand; and the serving member in the serving position comprises a longitudinal axis that is substantially perpendicular to the longitudinal axis of the stand.

9. A serving apparatus as claimed in claim 8, the serving platform in the stowed position being orientated in a substantially vertical plane; and the serving platform in the serving position being orientated in a substantially horizontal plane.

10. A serving apparatus as claimed in claim 1, wherein the reciprocal rotation of the serving member between a stowed position and a serving position occurs through at least one intermediary position.

11. A serving apparatus as claimed in claim 10, wherein the rotation mechanism defines:
  a first arc of reciprocal vertical rotation wherein the serving member is arranged to reciprocally rotate between the stowed position and a first intermediary position; wherein in the first intermediary position, the longitudinal axis of the serving member is substantially perpendicular to the longitudinal axis of the stand and the serving platform remains orientated in a substantially vertical plane;
  a second arc of reciprocal rotation wherein the serving member is arranged to reciprocally rotate between the first intermediary position and a second intermediary position, wherein in the second intermediary position the longitudinal axis of the serving member remains substantially aligned with the longitudinal axis of the serving member in the first intermediary position, and the serving platform is arranged in a substantially horizontal plane; and
  a third arc of reciprocal horizontal rotation wherein the serving platform is arranged to reciprocally rotate between the second intermediary position and the serving position; wherein during said rotation, the serving platform remains in a substantially horizontal plane.

12. A serving apparatus as claimed in claim 1, wherein the rotation mechanism comprises a retardation mechanism arranged to retard at least one period of rotation of the serving member.

13. A serving apparatus as claimed in claim 1, wherein the rotation mechanism comprises a low-friction portion.

14. A serving apparatus as claimed in claim 1, wherein the rotation mechanism has an adjustable locus with respect to the upper terminal end of the vertically-extending stand.

15. A serving apparatus as claimed in claim 1, wherein the serving platform is coupled to the serving member.

16. A serving apparatus as claimed in claim 15, wherein the serving apparatus is reversibly coupled to the serving member.

17. A serving apparatus as claimed in claim 15, wherein the serving platform is arranged to move with respect to the serving member.

18. A serving apparatus as claimed in claim 1, wherein the serving platform comprises a concave edge; wherein the concave edge is arranged to maximize proximity of the serving platform to a user.

19. A serving apparatus as claimed in claim 1, wherein the serving apparatus is modular, comprising reversible coupling between at least one selected from the range: serving member, serving platform, rotation mechanism, stand, connecting portion.

20. A serving apparatus as claimed in claim 1, wherein the rotation mechanism comprises a motor, the motor being arranged to provide motorized rotation of the serving member.

21. A serving apparatus as claimed in claim 1, wherein a length of the vertically-extending stand is adjustable.

22. A serving apparatus as claimed in claim 1, wherein the connecting portion is proximal a lower end of the vertically-extending stand.

23. A serving system comprising:
a chair; and
a serving apparatus comprising
   a serving member and a serving platform coupled to the serving member;
   a rotation mechanism in rotatable communication with the serving member; and
   a vertically-extending stand in communication with the rotation mechanism proximal an upper end thereof, the vertically-extending stand having a connecting portion distal the upper end thereof;
   said connecting portion reversibly coupling the stand to the chair;
   wherein the rotation mechanism is arranged to provide reciprocal rotation of the serving member between a stowed position and a serving position, wherein when in the serving position the serving platform is disposed to provide an upper surface configured to provide a surface on which a user sitting in the chair can be served a meal.

24. A chair as claimed in claim 23, wherein the stand is coupled to a leg of the chair.

25. A chair as claimed in claimed 23, wherein the connecting portion has an opening, and wherein the leg of the chair is disposed within the opening.

26. A chair as claimed in claim 23, wherein the stand is coupled to a lower end of a leg of the chair by the connecting portion.

* * * * *